United States Patent
Barany et al.

(10) Patent No.: US 6,594,252 B1
(45) Date of Patent: Jul. 15, 2003

(54) LOCATING CONTROL SIGNALS IN A MOBILE COMMUNICATIONS SYSTEM

(75) Inventors: Peter A. Barany, McKinney, TX (US); Shavantha Kularatna, Irving, TX (US); Shamim Akbar Rahman, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/368,217

(22) Filed: Aug. 4, 1999

Related U.S. Application Data

(60) Provisional application No. 60/122,459, filed on Mar. 1, 1999.

(51) Int. Cl.$^7$ .............................. H04B 7/212; H04J 3/06
(52) U.S. Cl. ........................ 370/347; 370/350; 370/503
(58) Field of Search .................. 370/350, 321, 370/328, 337, 347, 458, 465, 466, 467, 503, 507, 509, 510, 512, 522; 455/434, 515

(56) References Cited

U.S. PATENT DOCUMENTS

| | | | |
|---|---|---|---|
| 5,396,539 A | | 3/1995 | Slekys et al. |
| 5,570,467 A | * | 10/1996 | Sawyer ........................ 455/434 |
| 5,722,078 A | * | 2/1998 | Przelomiec et al. ......... 455/513 |
| 5,884,182 A | * | 3/1999 | Hoover ........................ 455/455 |
| 6,075,981 A | * | 6/2000 | Shah et al. .................. 455/434 |
| 6,363,055 B1 | * | 3/2002 | Sasson ........................ 370/347 |
| 6,396,827 B1 | * | 5/2002 | Paivike et al. .............. 370/347 |

FOREIGN PATENT DOCUMENTS

WO          WO 95/12936          5/1995

OTHER PUBLICATIONS

Rahnema, Overview of The GSM System and Protocol Architecture, IEEE, pp. 92–100, Apr. 1993.*
Matthews, Application of IS–136 to Personal Communication Services, IEEE, pp. 223–228, 1996.*
Peter Rysavy, *Paper: General Packet Radio Service (GPRS)*, Rysavy Research, for PCS Data Today Online Journal, pp. 1–5 (Sep. 30, 1998).

(List continued on next page.)

*Primary Examiner*—Dang Ton
*Assistant Examiner*—Frank Duong
(74) *Attorney, Agent, or Firm*—Trop, Pruner & Hu, P.C.

(57) ABSTRACT

A mobile communications system includes a first link and a second link (e.g., a circuit-switched link and a packet-switched link). When a mobile unit is initialized in the mobile communications system, it identifies a first control signal, such as the digital control channel (DCCH) of an IS-136 system, of the first link. From information associated with the first control signal, the mobile unit determines the existence of the second link (e.g., according to 136 HS). From information identifying a current frame structure in the first link, a pointer to the current frame structure of the second link can be derived.

10 Claims, 16 Drawing Sheets

OTHER PUBLICATIONS

Paul Meche, *UWC–136 RTT Update*, Conference Call, TR45.3/98.04.06.07R4 (TR45/98.03.19R6), Universal Wireless Communications Consortium, pp. 1–5, 177–180, 198, 212–214, and 242–250 (Feb. 26, 1999).

Paul Meche, *Evolution of TDMA to 3G*, Universal Wireless Communications Consortium, pp. 1–19, dated at least as early as Jun. 7, 1999.

*UWC–136: TDMA's Migration to Third Generation*, Universal Wireless Communications Consortium, pp. 1–2, printed from web site http://uwcc.org/ctiaw98/backg.htm, dated as early as Jun. 6, 1999.

*Universal Wireless Communications Consortium (UWCC) Announces UWC–136, The TDMA IS–136 Solution for Third Generation*, p. 1 (Feb. 23, 1998).

*UWC–136: TDMA's Evolutionary Path to Third Generation*, Question & Answers, pp. 1–2, dated at least as early as Jun. 6, 1999.

John Scourias, *Overview of the Global System for Mobile Communications*, pp. 1–15, printed from web site http://www.gsmdata.com/overview.htm (Oct. 14, 1997).

*TR 45 TIA/EIA–136–121–A Draft Text*, pp. 1–26, Digital Control Channel Layer 1, (Nov. 20, 1998).

*TR 45 TIA/EIA–136–123–A Draft Text*, pp. i–xii, 1, 45, Digital Control Channel Layer 3, (Nov. 20, 1998).

Nortel Networks, *UWC–136 Edge Control Channel Options*, UWCC.GTF.PDFG/99.02.09, pp. 1–17 (Feb. 9, 1999).

Nortel Networks, *Mechanisms for Implementing UWC–136 Edge Control Channels on a 200 KHZ RF Carrier*, UWC-C.GTF.PDFG/99.03.09R1, pp. 1–27 (Mar. 9, 1999).

Marc Grant, *PDFG–RF Group Meeting Summary*, UWC-C.GTF.PDFG/99.04.13, pp. 1–16 (Apr. 13, 1999).

Nortel Networks, *Impact on Maximum Cell Size of Robustness of the GSM SCH Burst Deployed in "Effective" 3/9 and 4/12 Frequency Reuse Patterns with Synchronized UWC–136 Edge 200 KHZ Base Stations*, UWCC.GTF.PDFG/99.04.13.26R2, pp. 1–14 (Apr. 13, 1999).

Nortel Networks, *Proposed New Optional Information Element for 30 KHZ DCCH Structure Message and Algorithm for Rapid Acquisition of Edge Compact PFCCH and PSCH*, UWCC.GTF.PDFG/99.05.05, pp. 1–4 (May 5, 1999).

Nortel Networks, *Concept Proposal for GPRS–136HS Edge*, ETSI STC SMG2, Revision 1.0, TDoc SMG2 530/99, Agenda Item 4.3, 6.2, 7.2.6.6, pp. 1–22 (May 31–Jun. 4, 1999).

\* cited by examiner

X = PTCCH
F = PFCCH
S = PSCCH

LOCATING CONTROL SIGNALS IN A MOBILE COMMUNICATIONS SYSTEM

The present application claims priority under 35 U.S.C. §119(e) to U.S. Provisional Patent Application Ser. No. 60/122,459, entitled "Mechanism for Implementing 136HS Control Channels on a 200 kHz RF Carrier Using a 1/3 Frequency Re-Use Pattern," filed Mar. 1, 1999.

BACKGROUND

The invention relates to locating control signals in a mobile communications system.

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

From the original advanced mobile phone system (AMPS) standard, additional wireless protocols have been developed and implemented. One such protocol is the time-division multiple access (TDMA) protocol, originally implemented as the IS-54 standard (EIA/TIA/IS-54) and later followed by the IS-136 standard (TIA/EIA-136) from the Telecommunications Industry Association (TIA). With IS-136 TDMA, each channel carries a frame that is divided into six time slots to support up to three mobile units per channel. If half-rate voice coders are used, then each channel may be time shared among up to six mobile units. Other TDMA-based systems include Global System for Mobile (GSM) communications systems, which use a TDMA frame divided into eight time slots (or burst periods).

Traditional speech-oriented wireless systems, such as the IS-136 and GSM TDMA systems, utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. With the rapid increase in the number of cellular subscribers in conjunction with the rising popularity of communications over data networks such as intranets or the Internet, a packet-switched wireless data connection that provides access to the data networks, electronic mail, files in databases, and other types of data has become increasingly desirable.

Several packet-based wireless connection protocols have been proposed to provide more efficient connections between a mobile unit and a data network. One such protocol is the General Packet Radio Service (GPRS) protocol, which complements existing GSM systems. Another technology that builds upon GPRS that has been proposed is the Enhanced Data Rate for Global Evolution (EDGE) technology, which offers a maximum data rate of 384 kilobits per second (kbps) and complements both GSM and IS-136 TDMA systems.

One technique to provide for packet data communications is to overlay a packet-switched system with existing circuit-switched mobile communications systems, such as the IS-136 and GSM systems. However, with the overlay solution, a mobile unit may need to acquire control channels in both the packet-switched system and circuit-switched system when the mobile unit is initialized, such as when the mobile unit is first started or when it initially enters into an area controlled by a mobile switching center. For example, the mobile unit may have to search through many traffic and other control channels to find a desired control channel. Such a process may be time consuming, during which the mobile unit is unavailable for use. A need thus exists to provide an improved mechanism to locate control channels in a mobile communications system that includes a plurality of links, such as a packet-switched link and a circuit-switched link.

SUMMARY

In general, according to one embodiment, a method for use in a mobile communications system having a first link and a second link includes communicating signals with a series of frame structures in the first link. Information indicating a current frame structure of the first link is identified, and a control signal in the second link is located using the information indicating the current frame structures of the first link.

Some embodiments of the invention may include one or more of the following advantages. A mechanism is provided to allow a mobile unit to more efficiently and quickly locate a desired control signal, such as a synchronization burst, in a mobile communications system having two or more links (e.g., a packet-switched link and a circuit-switched link). Such a mechanism is especially advantageous when used in a system in which at least one of the links communicates certain control channels (such as synchronization channels) as bursts rather than as a beacon that is transmitted continuously. User wait time during mobile unit initialization may be reduced since the mobile unit can more quickly locate and acquire a desired control signal.

Other features and advantages will become apparent from the following description and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1A:
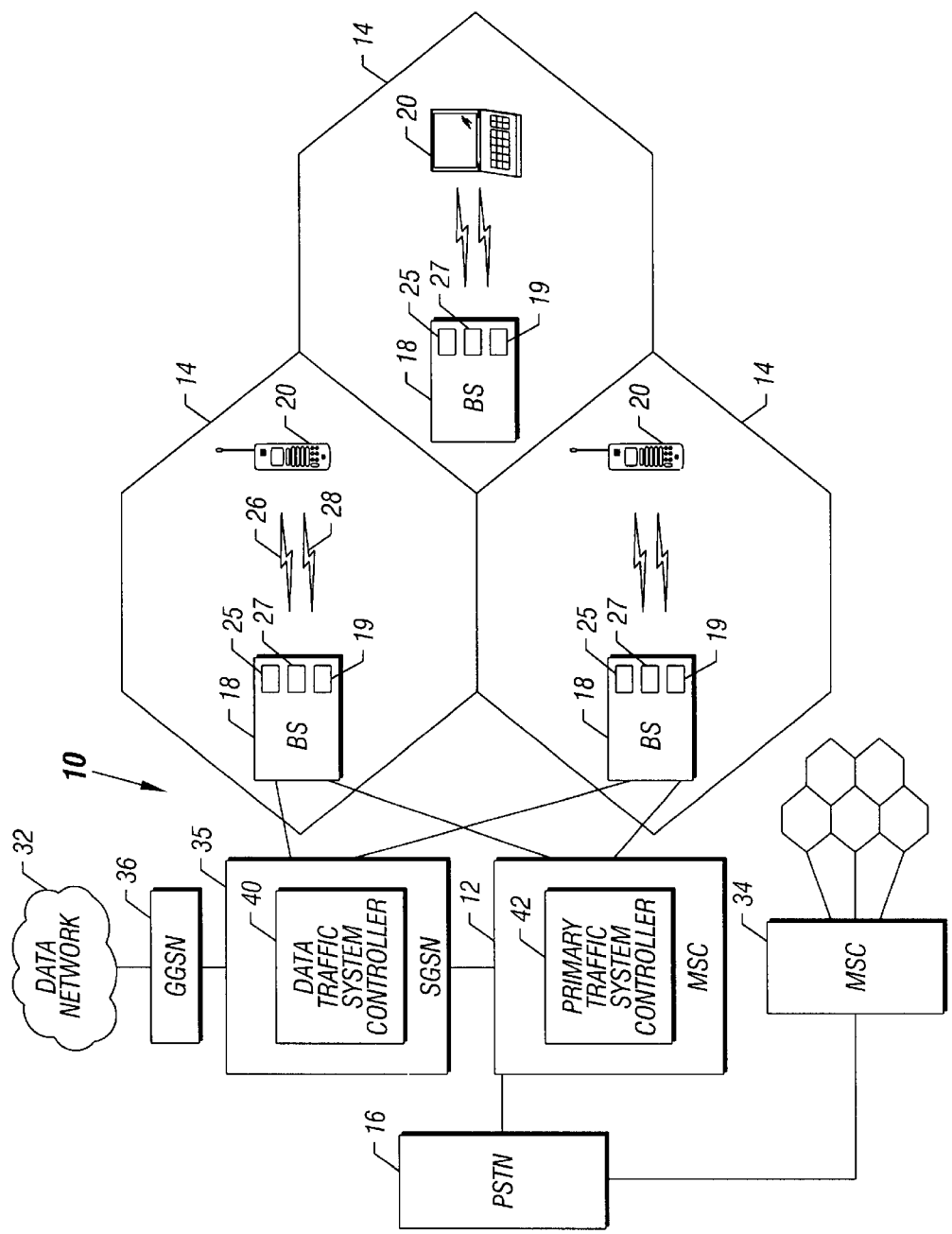
FIG. 1A illustrates an embodiment of a mobile communications system that provides both a circuit-switched traffic link and a packet-switched data link.

Referring to FIG. 1A, a mobile communications system 10, which may be a cellular or a personal communications services (PCS) system, includes a plurality of cells 14 each including a base station 18. The base station 18 is capable of communicating with mobile units 20 (e.g., mobile telephones, mobile computers, or other types of mobile units) over radio frequency (RF) wireless links. The base stations 18 are controlled by a mobile switching center (MSC) 12 for circuit-switched communications. For packet-switched or message-switched communications, the base stations 18 are controlled by a data traffic service node 35. In further embodiments, groups of base stations 18 may be controlled by base station controllers (not shown) that are in communication with the MSC 12 and the data traffic service node 35.

In one embodiment, the base station 18 and mobile units 20 in each cell 14 are capable of communicating with two sets of carriers—a first set of carriers 26 for communicating circuit-switched traffic (e.g., speech data, short messaging services, and other circuit-switched data) and associated control signals; and a second set of carriers 28 for communicating packet-switched data traffic and associated control signals. As used here, circuit-switched traffic is referred to as primary traffic and packet-switched data traffic is referred to as packet data traffic. Packet data traffic may refer to any traffic that is sent in bursts of messages, packets, or other data structures, over a link.

The packet data traffic services provided in the system 10 are complementary to (that is, overlays) the primary traffic services offered by a conventional circuit-switched system, such as a time-division multiple access (TDMA) system according to the IS-136 protocol (TIA/EIA-136 from Telecommunications Industry Association). The packet data traffic services in one embodiment may be according to the 136 high speed (136 HS) protocol as adopted by the Universal Wireless Communication Consortium (UWCC). The 136 HS protocol (also referred to as EDGE Compact) incorporates much of the Enhanced Data Rate for Global Evolution (EDGE) technology adopted by ETSI (European Telecommunications Standards Institute), but uses a reduced frequency spectrum.

Figure 2:
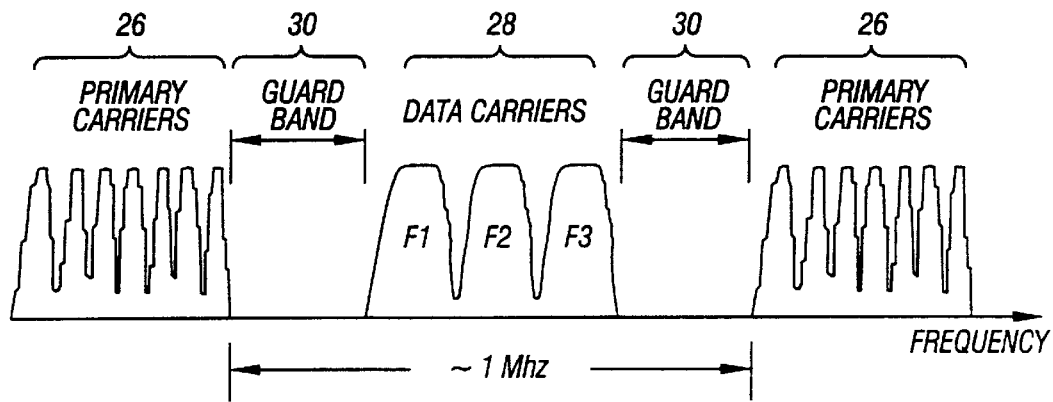
FIG. 2 illustrates carriers for use in the mobile communications system of FIG. 1A.

Referring further to FIG. 2, according to one embodiment, the base stations 18 include transceivers 25 that send and receive 30-kHz (kilohertz) carriers (26) to carry circuit-switched traffic and associated control signals, e.g., according to the IS-136 protocol. In addition, packet data traffic and associated control signals are carried by 200-kHz carriers (28) that may be provided by transceivers 27 in each base station 18 in the same cell as the 30-kHz carriers. Guard bands 30 are defined between the first set of carriers 26 and the second set of carriers 28. The second set of three 200-kHz carriers 28 and guard bands 30 may be deployed in less than approximately 1 MHz of frequency spectrum.

The MSC 12 includes a primary traffic system controller 42 that controls the establishment, processing, and termination of calls (e.g., speech, short messages, and so forth) between or among mobile units 20 in one or more cells 14 or between or among mobile units 20 in a cell 14 and a wireline device (e.g., a telephone) coupled to a public switched telephone network (PSTN) 16. More than one MSC (such as an MSC 34 associated with a different service provider) may be included in the mobile communications system 10.

The data traffic service node 35 includes a data traffic system controller 40 that controls the establishment, processing, and termination of packet-switched communications. In one embodiment, the data traffic service node 35 may be a serving GPRS support node (SGSN) according to the General Packet Radio Service (GPRS) protocol. Also in accordance with GPRS, the SGSN 35 communicates with a gateway GPRS support node (GGSN) 36, which provides an interface to a data network 32. Example data networks 32 include local area networks (LANs), wide area networks (WANs), the Internet, or other types of private or public networks. Communications across data networks may proceed according to TCP/IP (Transmission Control Protocol/Internet Protocol). More generically, the nodes 35 and 36 may include any system or systems that are capable of controlling packet-switched data communications between a mobile unit 20 and the data network 32. Further, the nodes 35 and 36 may be implemented in the same platform as the MSC 12 in an alternative embodiment.

In the illustrated embodiment, the data traffic system controller 40 and the primary traffic system controller 42 (implementable with software or a combination of software and hardware) may be in separate platforms (the data traffic service node 35 and the MSC 12, respectively). In an alternative embodiment, the system controllers 40 and 42 may be implemented in the same platform. Similarly, transceivers for sending and receiving carriers 26 and 28 may be included in the same base station 18 or in separate base stations.

Effectively, two wireless links are provided for mobile units 20 in the cells 14 controlled by the MSC 12: a packet data link, including the carriers 28, the base stations 18, and the data traffic system controller 40, to provide relatively high-speed (up to 384 kbps or higher, for example) packet-switched communications between mobile units 20 and the data network 32; and a primary traffic link, including the carriers 26, the base stations 18, and the primary traffic system controller 42 to provide speech and other circuit-switched communications between mobile units 20 or between a mobile unit 20 and a PSTN unit.

In accordance with some embodiments, a locate mechanism is provided to enable a mobile unit to more efficiently and quickly acquire control channels in the packet data link. The control channels, including synchronization channels, in the packet data link are sent as bursts rather than as beacons that are continuously transmitted, which makes it more difficult and time consuming to locate a desired control channel such as a synchronization channel. The locate mechanism includes a locate element in the primary traffic system controller 42 that keeps track of the relation between frame structures carrying traffic and control channels in the primary traffic link and frame structures carrying traffic and control channels in the packet data link. As used here, a frame structure refers to any one or more of the frames (e.g., TDMA frame, superframe, hyperframe, or other structures) used to carry traffic control signaling in either the primary traffic link or the packet data link.

In one embodiment, the locate element (which includes counters) counts the number of primary traffic frame structures that have elapsed to identify the current data traffic frame that is being communicated. The locate element further includes a special counter to enable the correlation between the primary traffic frame structures and packet data frame structures. Since the primary traffic frame structures and packet data frame structures are synchronized, the information identifying the current primary traffic frame structure and the value of the special counter may be used to generate a pointer that points to the current packet data frame structure so that predetermined control channels can be more quickly located by a mobile unit 20. Without the locate element in accordance with some embodiments, a mobile unit 20 may have to search through various bursts to find the desired control signals.

In one example embodiment, the primary traffic system controller 42 controls communications according to the IS-136 protocol. In the primary traffic link, TDMA frames may be used to carry traffic and control signals. A frame according to IS-136 includes six time slots. In the packet data link, TDMA frames are also defined to carry data traffic and associated control signals. The TDMA frame for the packet data link may be similar to a GSM (Global System for Mobile Communications) frame with eight time slots (also referred to as burst periods) TN0–TN7.

The channels employed in the packet data link include packet broadcast control channels (PBCCH), packet common control channels (PCCCH), and packet data traffic channels (PDTCH). The broadcast control channels PBCCH, communicated downlink (from base station to mobile unit), provide general information on a per base station basis (e.g., cell/sector specific information) including information employed for mobile units 20 to register in the system 10. The common control channels PCCCH carry signaling information used for access management tasks (e.g., allocation of dedicated control channels and traffic channels). PCCCH includes a packet paging channel (PPCH) and a packet access grant channel (PAGCH) for downlink communications, and PCCCH includes a packet random access channel (PRACH) for uplink communications (mobile unit to base station). PRACH is used by a mobile unit 20 to request access to the system 10. PPCH is used by the base station 18 to alert a mobile unit 20 of an incoming call. PAGCH is used to allocate a channel to a mobile unit 20 for signaling to obtain a dedicated channel following a request by the mobile unit 20 on PRACH. Other control channels include a packet frequency correction channel (PFCCH) and a packet synchronization channel (PSCH). PFCCH and PSCH are used to synchronize a mobile unit 20 to the time slot structure of each cell by defining the boundaries of burst periods and time slot numbering. In one embodiment, the control channels discussed above are extensions of circuit-switched logical channels used in a GSM system.

Figure 3:
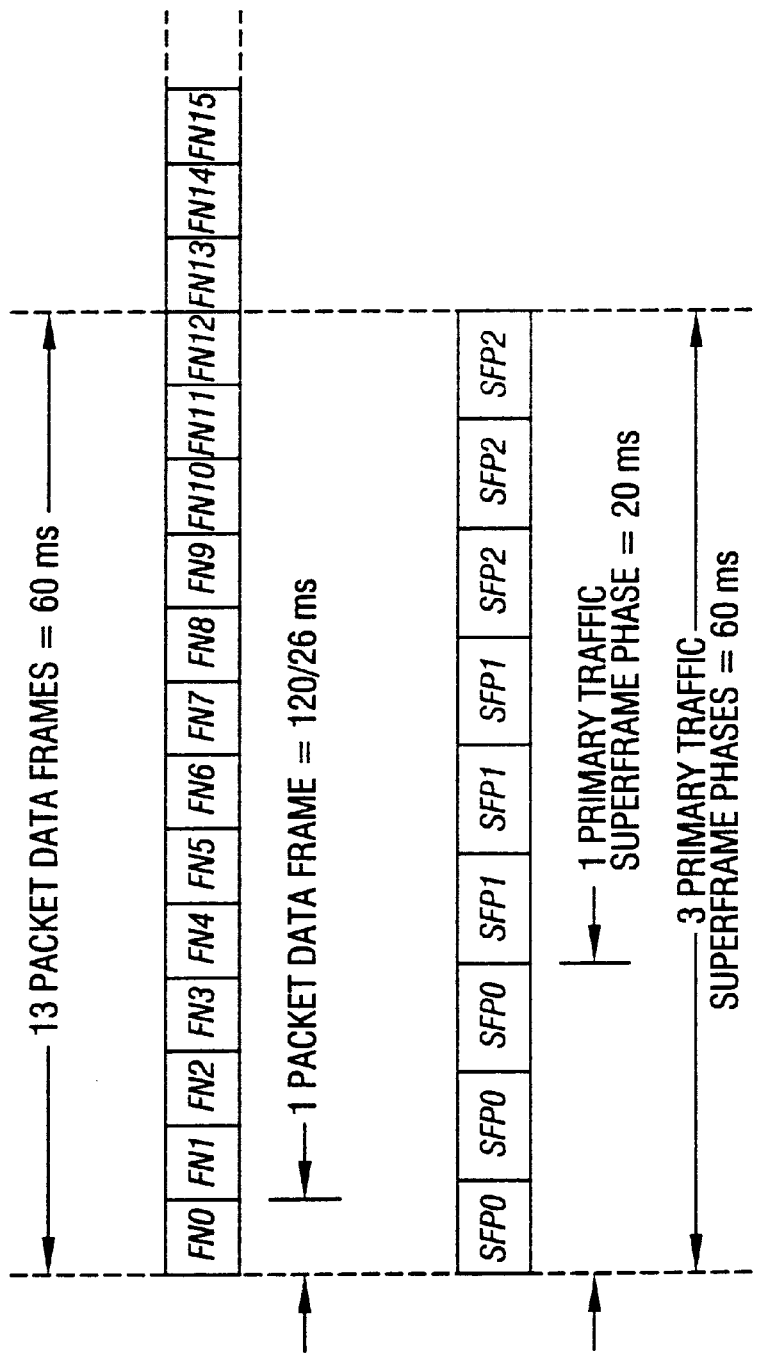
FIG. 3 illustrates synchronization of frame structures between the circuit-switched traffic link and the packet-switched data link of FIG. 1A.

To more quickly locate predetermined packet data control channels, a pointer is created in a control channel of the primary traffic link that points to the current frame structure of the packet data link. This is made possible since the packet data frame structures are synchronized to the primary traffic frame structures. Referring to FIG. 3, synchronization between the primary traffic frame structures and packet data frame structures is illustrated. Thirteen packet data frames (which may be similar to GSM time frames) occupy the same time period as three primary traffic superframe phases (such as superframe phases defined by the IS-136 protocol). In the illustrated embodiment, the common time period is 60 milliseconds (ms).

Figure 4:
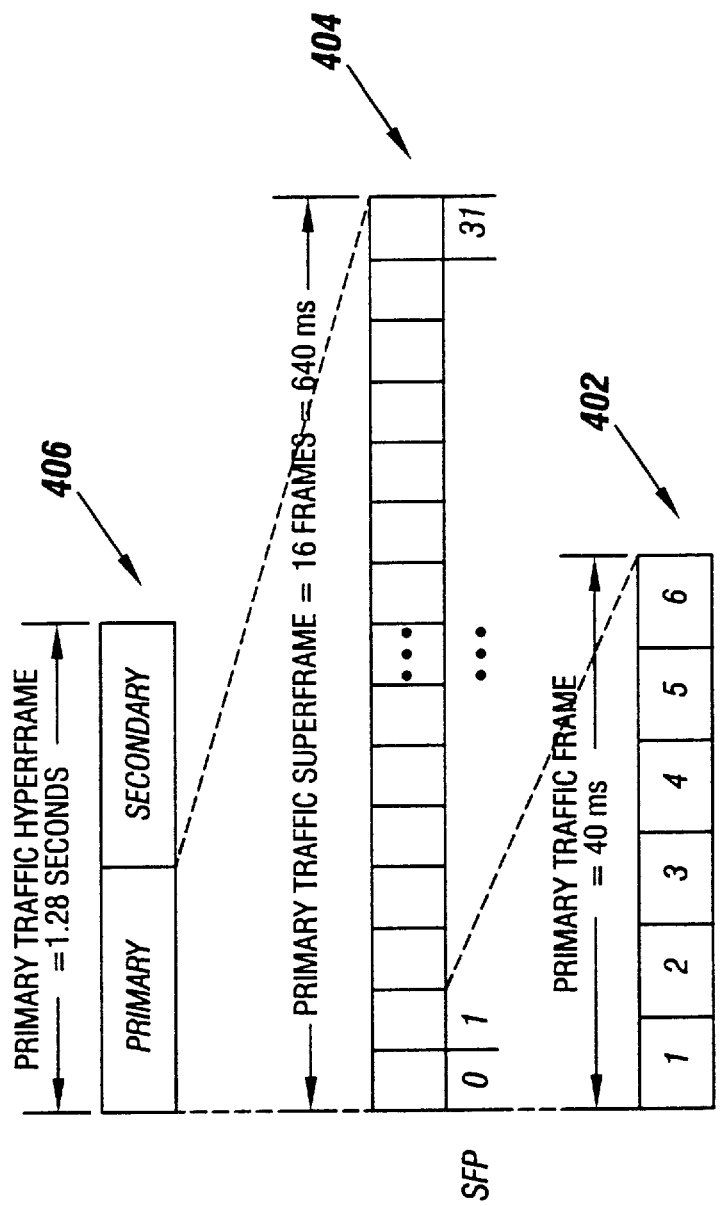
FIG. 4 illustrates frame structures employed by the circuit-switched traffic link of FIG. 1A.

Referring to FIG. 4, the frame structures according to the IS-136 protocol include a primary traffic frame (generally indicated as 402), a superframe (generally indicated as 404), and a hyperframe (generally indicated as 406). The frame 402 includes six time slots and is a 40-ms frame structure. In one mode of primary traffic communications, each mobile unit is assigned two time slots in the frame 402 (e.g., time slots 1 and 4 assigned to a first mobile unit, time slots 2 and 5 assigned to a second mobile unit, and time slots 3 and 6 assigned to a third mobile unit). The primary traffic superframe 404 includes 16 frames 402 which may occupy a total period of 640 ms. The primary traffic superframe 404 is divided into 32 phases, referred to as superframe phases (SFP) 0–31. In addition, a primary traffic hyperframe 406 according to IS-136 includes two superframes 404: one primary and the other secondary.

Figure 5:
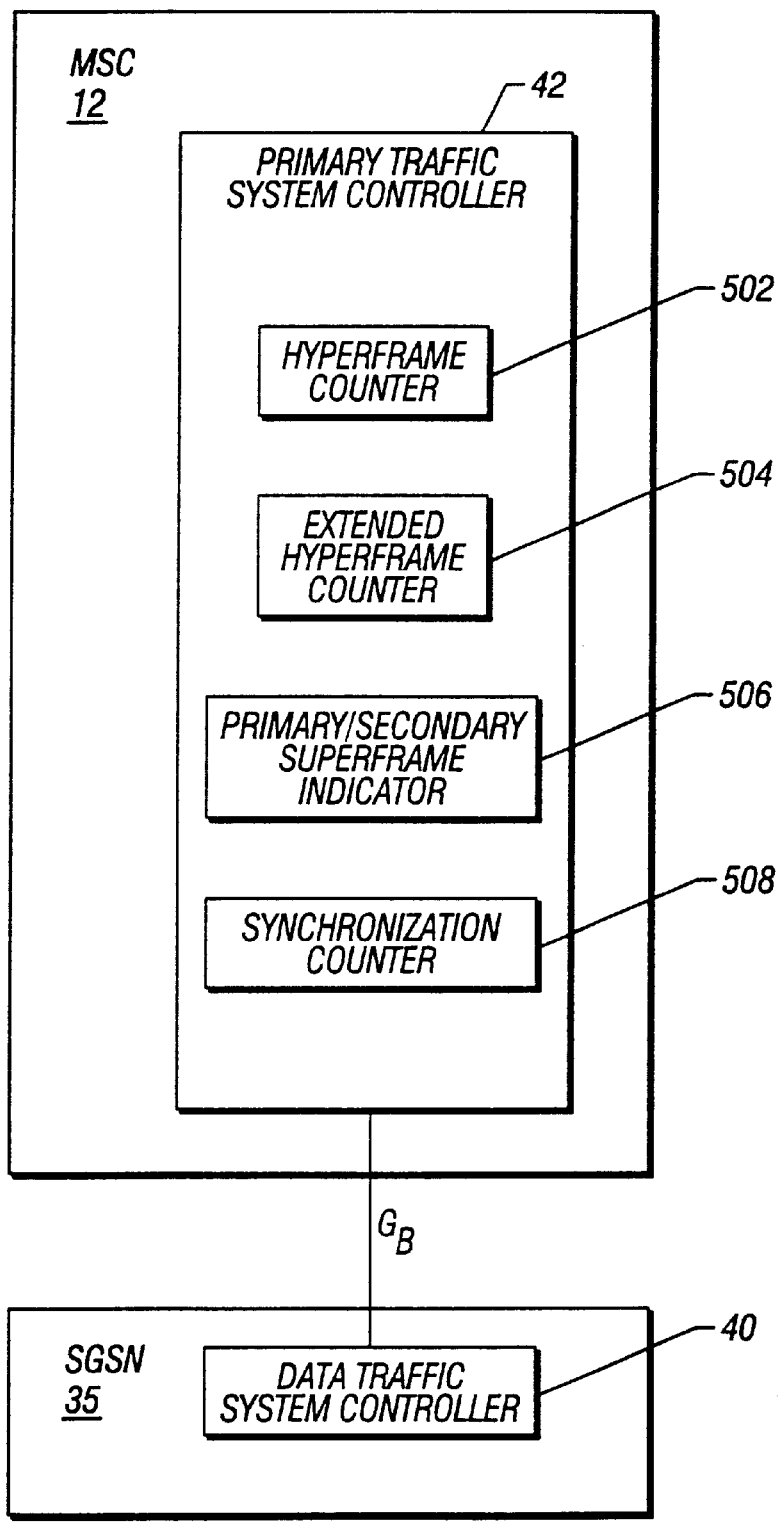
FIG. 5 illustrates counters in a primary traffic system controller in accordance with one embodiment in the mobile switching center of FIG. 1B.

Referring to FIG. 5, in accordance with the IS-136 protocol, the primary traffic controller 42 includes a hyperframe counter 502 (which may be a four-bit counter that counts from 0 to 11). The hyperframe counter 502 is incremented with each communication of a primary traffic hyperframe 406. After the hyperframe counter 502 cycles through 0 to 11, it resets to 0. In addition to the hyperframe counter 502, the primary traffic system controller 42 also includes an extended hyperframe counter 504, which is an optional counter defined by IS-136. The extended hyperframe counter 504 counts from 0 to 7 and increments every 12 hyperframes. The primary traffic system controller 42 also includes a primary/secondary superframe indicator 506 to indicate whether transmission is occurring in the primary superframe or secondary superframe of the primary traffic hyperframe 406 (FIG. 4). Further, in accordance with some embodiments, a special counter 508 (referred to as a synchronization counter) is added to the primary traffic system controller 42. Alternatively, the synchronization counter 508 is implemented outside the primary traffic system controller 42 but is accessible by the system controller 42. The synchronization counter 508, in one embodiment, is a 7-bit counter that counts from 0 to 101. The synchronization counter 508 increments after each complete cycle of the extended hyperframe counter 504 (0–7). In one embodiment, a complete cycle of the hyperframe counter 502 (counting from 0 through 12) occupies a period of 15.36 seconds (12×hyperframe period or 12×1.28 seconds). Eight counts (0 through 7) of the extended hyperframe counter 504 occupies 122.88 seconds (8×15.36 seconds), which is the period of each increment of the synchronization counter 508. The synchronization counter 508 counting through 102 increments occupies 12,533.76 seconds (102×122.88 seconds). As further illustrated in FIG. 6, the total time period in going through one complete count cycle of the synchronization counter 508 is the same as the time period of one packet data hyperframe 612 used to carry packet data traffic and control channels in the packet data link.

Figure 6:
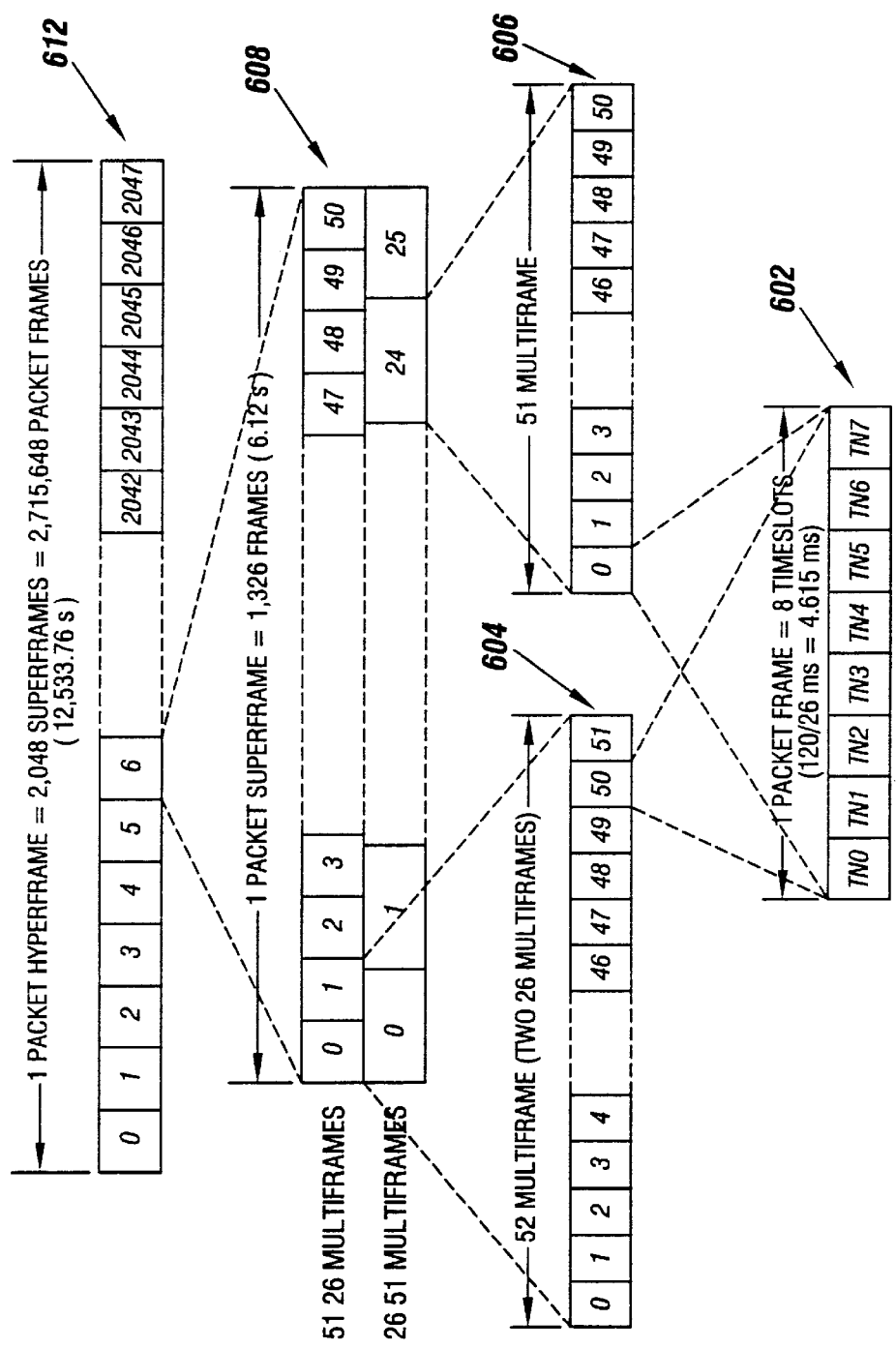
FIG. 6 illustrates frame structures employed by the packet-switched data link of FIG. 1A.
Figure 7:
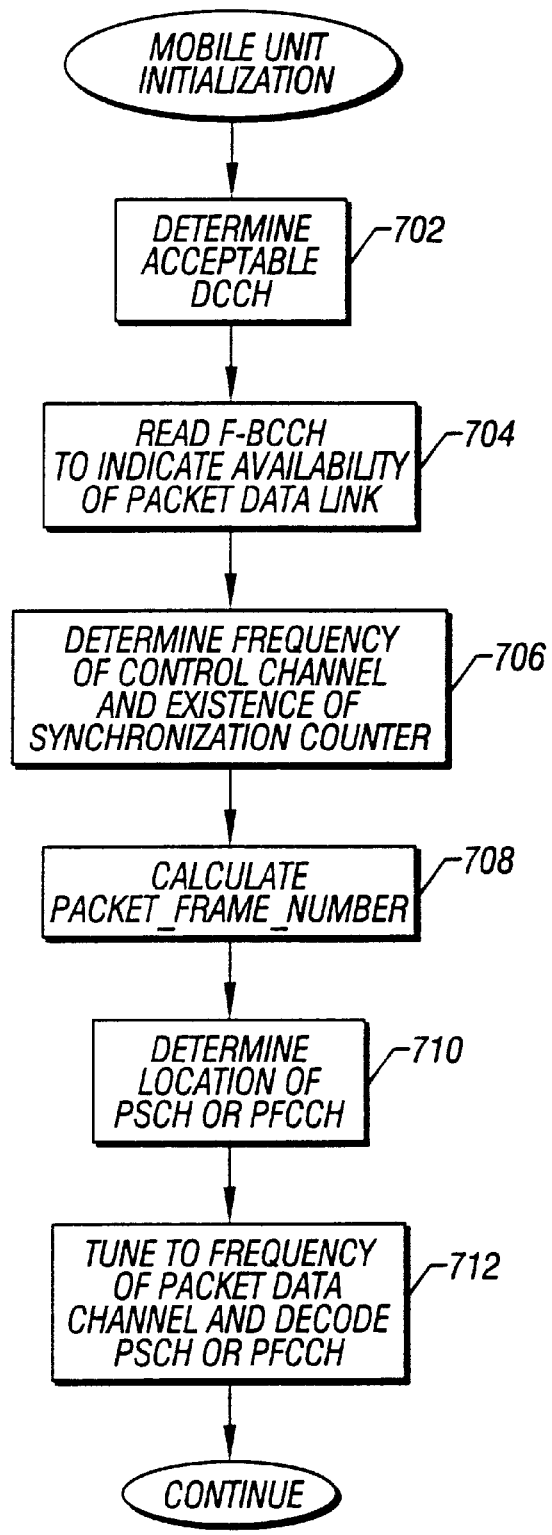
FIG. 7 is a flow diagram of an initialization process in accordance with one embodiment performed by a mobile unit in the mobile communications system of FIG. 1A.

Referring to FIG. 6, the frame structures for the packet data link are illustrated. The basic TDMA frame (similar to a GSM frame) includes eight time slots TN0–TN7. Above that, a 52-frame multiframe 604 or a 51-frame multiframe 606 may be used, with either multiframe structure carrying various packet control and data channels, including PDTCH, PACCH, PTCCH, PSCH, PFCCH, PBCCH, and PCCCH. One 52-frame multiframe 604 is made up of two 26-frame multiframes, and one packet superframe 608 is made of 51 26-frame multiframes. Effectively, one packet superframe 608 includes 1,326 packet frames 602. The time period occupied by 51 26-frame multiframes is the same time period occupied by 26 51-frame multiframes 606. One packet hyperframe 612 includes 2,048 packet superframes and occupies the same time period as the synchronization counter 508 counter (12,533.76 s).

Thus, to determine the current packet frame number from counters in the primary traffic system controller 42, the following equation may be used:

$$\begin{aligned}\text{Packet\_Frame\_Number} = \\ \frac{26}{120} \times \{ \text{Synch\_Count} \times 122880 + \text{E\_Hyper\_Count} \times 15360 + \\ \text{H\_Count} \times 1280 + P/S \times 640 + SPF \times 20 \},\end{aligned}$$

in which Synch\_Count represents the value of the synchronization counter 508, E\_Hyper\_Count represents the value of the extended hyperframe counter 504, H\_Count represents the value of the hyperframe counter 502, P/S represents the primary/secondary superframe indicator 506, and SPF represents the superframe phase. From the values of the counters 502, 504, and 508 and the value of the primary/secondary superframe indicator 506, a pointer Packet\_Frame\_Number to the current frame of the packet data link is determined so that certain control channels in the frame structure may be more easily and quickly located.

More generally, the location of control channels in the packet data link is determined based on a pointer derived in part from the current frame structure of the primary traffic link. Correlation of the current primary traffic frame structure to the current packet data frame structure may be achieved by using a special counter (the synchronization counter 508). The period defined by an entire cycle of the synchronization counter 508 is equal to the period of a packet data hyperframe (similar to a GSM hyperframe) that carries packet traffic and control channels. Because the primary traffic frames and packet data frames are synchronized as illustrated in FIG. 3, the values of the counters tracking primary traffic frame structures and the value of the special counter may be used to determine the pointer to the current packet data frame.

Although reference is made to specific frame structures according to GSM and IS-136 in accordance with one embodiment, the invention is not to be limited to this respect. The locate feature may be extended to other types of wireless systems (having different frame structures) in which it is desired to locate predetermined control signals.

Figure 16:
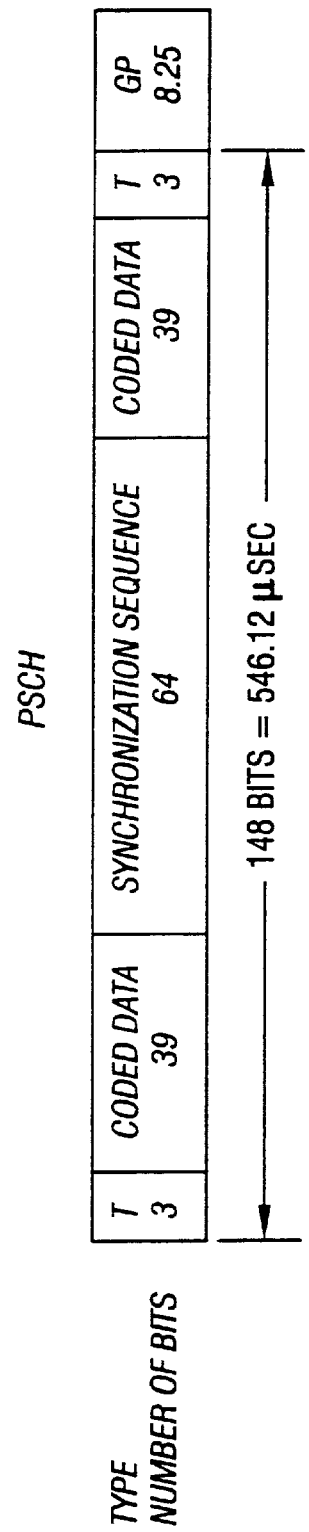
FIG. 16 illustrates a synchronization burst for use in the packet-switched data link.

According to one embodiment, two control channels of interest are the packet frequency correction channel (PFCCH) and the packet synchronization channel (PSCH) in the 52-frame packet multiframe 604. As noted, PFCCH and PSCH are used to synchronize a mobile unit 20 to the time slot structure of the frames used in the packet data link. Referring to FIG. 16, a PSCH burst is illustrated. In one embodiment, the PSCH burst is 148 bits long plus a guard period (GP) of 8.25 bits (symbols). Synchronization of the mobile unit 20 is performed in the synchronization sequence portion of the PSCH burst. The PFCCH burst also has the same length as the PSCH burst, and includes a portion in which the sequence of frequency error correction is performed.

In one example, PFCCH may be placed in frame number FN 25 of the 52-frame multiframe 604, while PSCH may be placed in frame number FN 51. Thus, in this example, the value of Packet\_Frame\_Number modulo 25 being equal to zero implies that the current packet frame is frame number FN 25, which carries the PFCCH channel. The value Packet\_Frame\_Number module 51 being equal to zero implies that the current packet frame is frame number FN 51, which carries the PSCH channel. This can be generalized for the example embodiment by providing that Packet\_Frame\_Number module 25 being equal to the value N implies that the frame number FN 25 is N-25 frames away from the beginning of the current packet data frame. Similarly, the value Packet\_Frame\_Number module 51 being equal to N implies that frame number 51 is N-51 frames away from the beginning of the current packet data frame.

The following provides examples in which the value of Packet\_Frame\_Number is calculated given example values of the counters 502–508. Thus, if Synch\_Count is 0, E\_Hyper\_Count is 0, H\_Count is 1, P/S is 0, and SPF is 15, then the value of Packet\_Frame\_Number is 343.33, which indicates that, at the beginning of primary superframe phase SPF 15, the packet data frame number FN 342 has passed and frame number FN 343 is continuing. If Synch Count is 0, E\_Hyper\_Count is 0, H\_Count is 1, P/S is 1, and SPF is 15, then the value of Packet\_Frame\_Number is 481, which indicates that, at the beginning of secondary superframe phase SPF 15, the packet frame number FN 481 has passed and frame number FN 482 is beginning.

Referring to 7, the initialization sequence of the mobile unit 20 when it first powers up or when it first enters the region controlled by the MSC 12 is illustrated. Using standard search techniques according to IS-136 or some other primary traffic protocol, the mobile unit 20 determines (at 702) an acceptable circuit-switched control channel, e.g., DCCH (or digital control channel), of the primary traffic link. When an appropriate DCCH has been found, the mobile unit 20 reads (at 704) the F-BCCH (Forward Broadcast Control Channel) in DCCH that carries broadcast information for mobile units to find the structure of the DCCH and other information. The F-BCCH may also be configured to include information identifying the availability of a packet data link. In addition, from the F-BCCH, the mobile unit 20 can determine (at 706) the frequency of the control channel of the packet data link and existence of the synchronization counter 508. If the mobile unit 20 determines that the packet data link exists, then it calculates (at 708) the value of Packet\_Frame\_Number based on the values of the counters 502–508 to determine the current packet frame number. Next, from the value of Packet\_Frame\_Number, the mobile unit determines (at 710) the location of predetermined bursts such as PSCH or PFCCH. Using the value of Packet\_Frame\_Number, the mobile unit 20 can determine how far away it is from a frame containing the desired control channel. The mobile unit can then wait for that packet data frame to occur, at which time the mobile unit 20 can tune to the frequency of the packet data channel to decode the burst PSCH or PFCCH (at 712). After this, the mobile unit 20 can proceed to perform packet data communications over the packet data link.

More generally, when a mobile unit 20 is initialized, it searches for a predetermined control signal in the primary traffic link. From the predetermined primary traffic control signal the mobile unit 20 can determine if the packet data link is available, and if so, the mobile unit determines a pointer to the current frame structure in the packet data link based on information identifying a current frame structure of the primary traffic link. From the pointer, the mobile unit 20 can locate a desired control signal of the packet data link. The primary traffic link communicates with a series of primary traffic frame structures that are synchronized with packet frame structures of the packet data link. Counter values provided by the primary traffic system controller 42 in effect tracks the current frame structure (e.g., the current superframe phase of the current hyperframe) of the primary traffic link. From the counter values, the current frame structure of the packet data link can be located.

Thus, according to some embodiments of the invention, a locate mechanism is provided to allow a mobile unit 20 to identify relatively quickly and efficiently which packet data frame it is currently communicating in so that the mobile unit 20 can retrieve certain control channels, such as PFCCH and PSCH, to synchronize the mobile unit 20 in the packet data link. Such a mechanism is especially advantageous when used in a system in which at least one of the links communicates certain control channels (such as synchronization channels) as bursts rather than as a beacon that is transmitted continuously. Searching for bursts of synchronization channels such as PFCCH and PSCH may be time consuming. By deriving a pointer in a primary traffic control channel to point to the current frame of the packet data link, such synchronization channels can be more quickly identified. User wait time during mobile unit initialization may be reduced since the mobile unit can more quickly locate and acquire a desired control signal.

Figure 8:
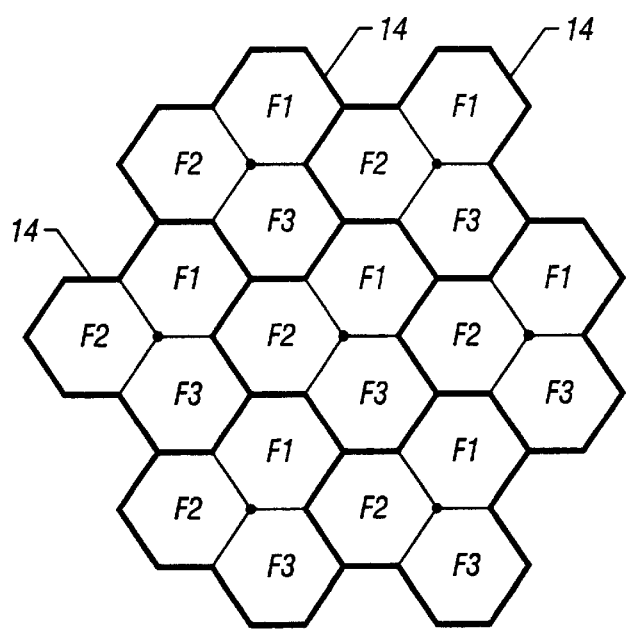
FIG. 8 illustrates a 1/3 channel reuse pattern for packet data traffic communicated over the packet-switched data link in the mobile communications system of FIG. 1A.

In one arrangement of the mobile communications system, each cell may be divided into three sectors. The primary traffic link may utilize a 7/21 channel reuse pattern. For the packet data link, each base station site is allocated three frequencies F1, F2, and F3 (see also FIG. 2), one per sector, using a 1/3 frequency reuse pattern for data traffic, as illustrated in the tricellular representation of FIG. 8. As is generally known in the art, an equivalent trisector representation may also be used to show the cellular arrangement of FIG. 8. One frequency Fx is allocated per sector of each cell 14. Data traffic in the packet data link may employ various mechanisms, including link adaptation and incremental redundancy, to provide more robust C/I performance in a 1/3 channel reuse pattern. However, for control signals in the data link, the 1/3 channel reuse pattern is vulnerable to interference because the same frequencies are reused within relatively small distances of each other. To provide more robust C/I performance, a higher effective channel reuse pattern, e.g., 3/9, 4/12, and other patterns, may be employed. This is made possible by creating time groups so that control channels may be staggered in time to create the higher effective channel reuse pattern.

Figure 9:
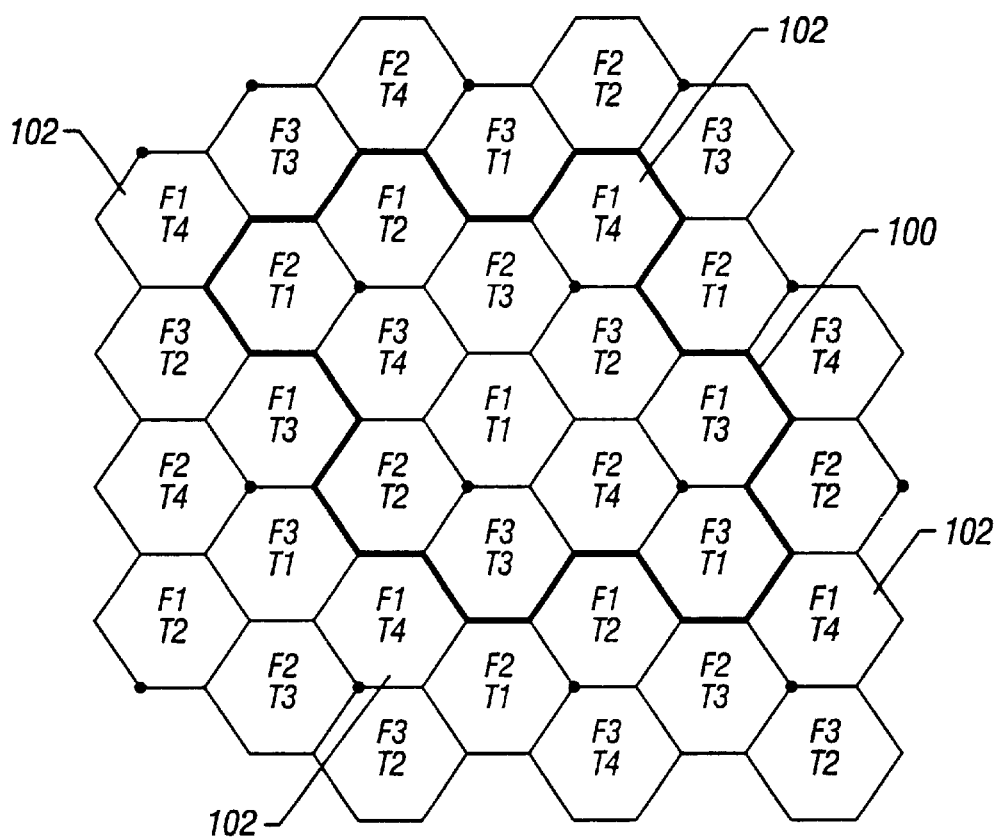
FIGS. 9 and 10 illustrate effective 4/12 and 3/9 channel reuse patterns in accordance with some embodiments that may be employed by the packet-switched data link of the mobile communications system of FIG. 1A.

Referring to FIG. 9, an effective 4/12 channel reuse pattern is illustrated. In the 4/12 pattern, four time groups (T1–T4) are created. Thus, in addition to a reuse pattern based on the three frequencies F1–F3, the reuse pattern also has an orthogonal aspect based on time (T1–T4). Thus, each sector is assigned a frequency Fx as well as a time group Ty. With three frequencies F1, F2, and F3 and four time groups T1, T2, T3, and T4, a cluster 100 of 12 sectors can be defined. The cluster 100 is then repeated to provide the effective 4/12 channel reuse pattern. In effect, time reuse that is added on top of frequency reuse creates a higher effective channel reuse pattern for control channels on the packet data link, thereby creating more robust performance with reduced interference problems.

As illustrated in FIG. 9, a sector having a certain frequency Fx in time group Ty is separated by some distance from another sector having the same frequency Fx and being in the same time group Ty (generally the distance provided by the width and length of each cluster 100). For example, the sectors 102 having frequency F1 and belonging to time group T4 are separated by relatively large distances from each other to reduce the likelihood of interference.

Figure 10:
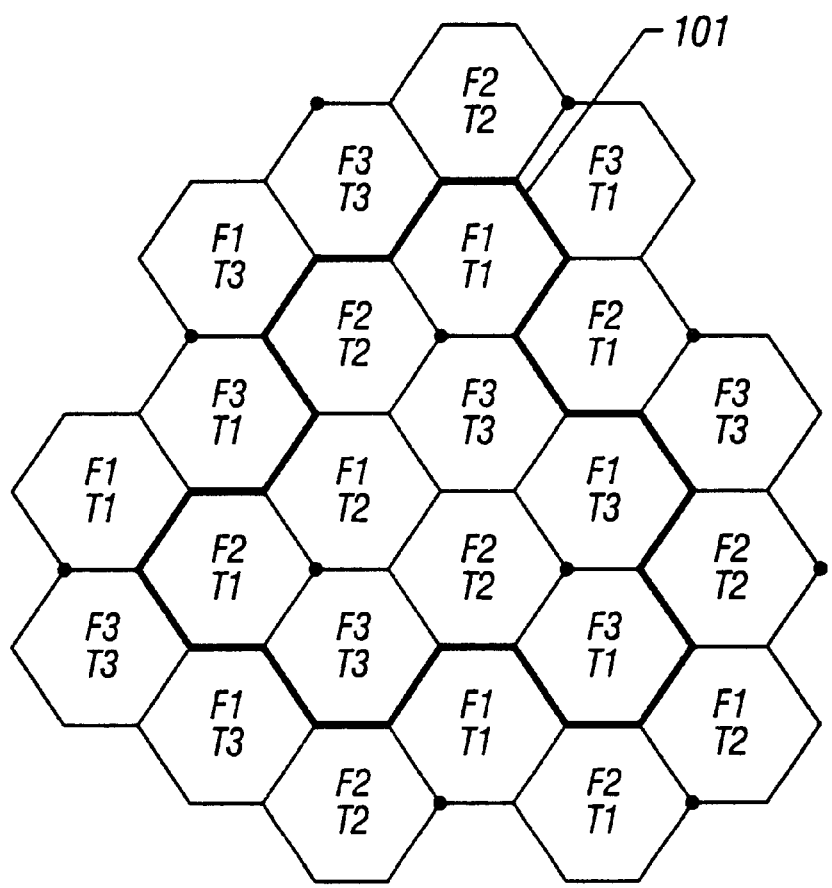

Referring to FIG. 10, an effective 3/9 reuse pattern is illustrated. The 3/9 reuse pattern utilizes three time group T1, T2 and T3. This effectively provides a cluster 101 of nine sectors in which each sector has a distinct combination of a frequency Fx and time group Ty. Other reuse patterns may also be defined.

The control channels that are communicated with the higher effective 3/9, 4/12, or other channel reuse pattern include PBCCH, PCCCH, PFCCH, and PSCH. The data traffic channels PDTCH and associated traffic control channels, PTCCH (packet timing advance control channel) and PACCH (packet associated control channels) use the 1/3 reuse pattern, since traffic channels employ various mechanisms, as noted above, to better withstand interference from neighboring cell segments.

To enable the creation of time groups so that they can be allocated among sectors of each cluster (100 or 101) to provide higher effective channel reuse, the base stations 18 are time synchronized with each other. This may be performed by using a global positioning system (GPS) timing receiver or some other synchronization circuit 19 (FIG. 1) in each base station 18. Synchronization of the base station 18 is employed to ensure alignment of the time groups in the cell sectors. Base station synchronization is carried out such that the following two criteria are satisfied. TDMA frames (including time slots TN0–TN7) of the packet data link are aligned with each other in all sectors. Thus, time slot TN0 occurs at the same time at each base station site in each sector, to within tolerances of the synchronization equipment and any differences in propagation delays. Further, according to one embodiment, the control and traffic channels of the data link are carried by a multiframe structure (discussed further below in connection with FIGS. 9–11). Each multiframe structure starts with frame 0 and continues to frame NN (e.g., 50 or 51). When time synchronized, frame 0 occurs at the same time in each sector.

Figure 1B:
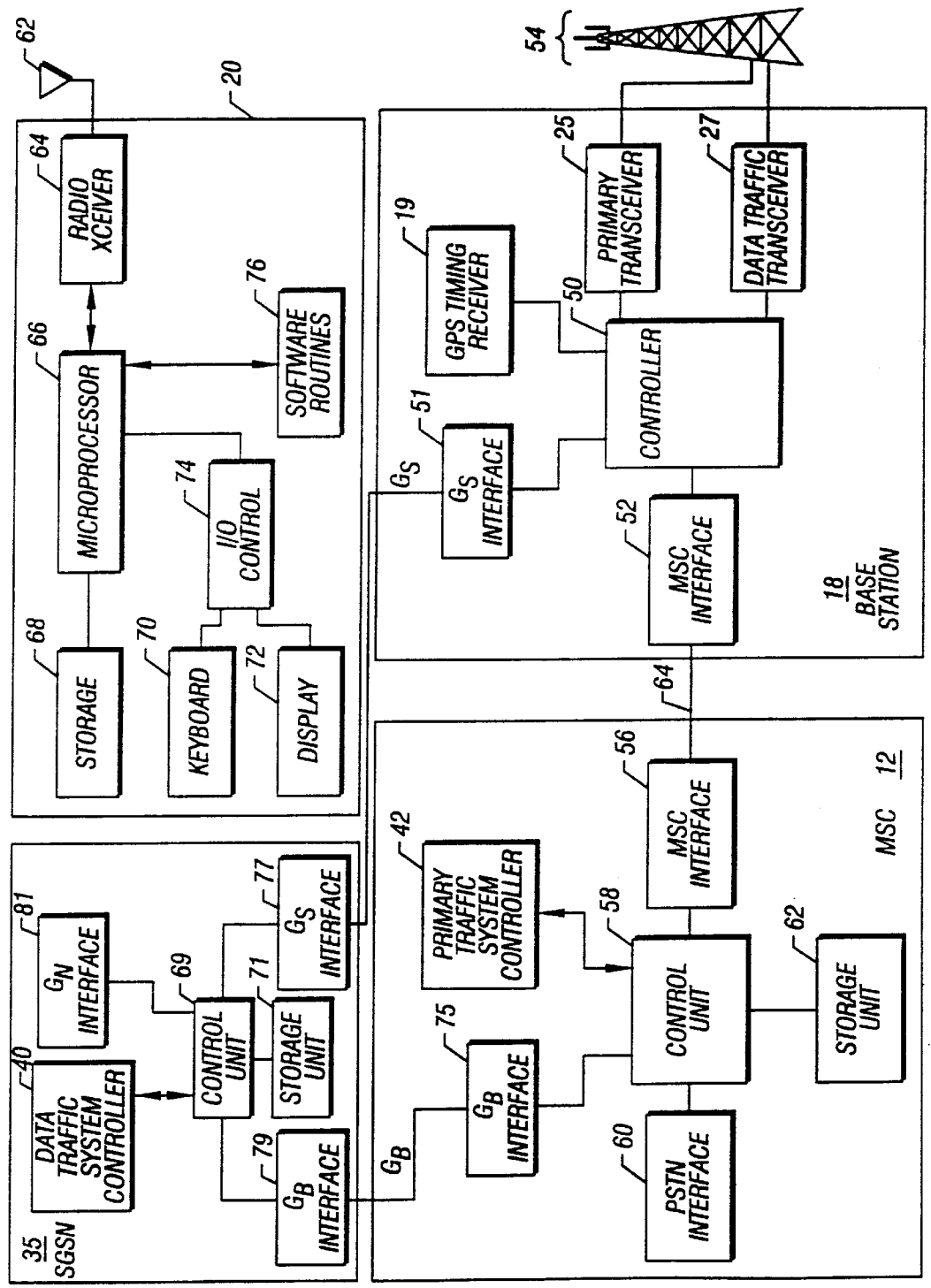
FIG. 1B is a block diagram of components in a mobile switching center (MSC), a base station, a data traffic service node, and a mobile unit in the mobile communications system of FIG. 1A.

Referring to FIG. 1B, components of the MSC 12, a base station 18, data traffic service node 35, and a mobile unit 20 are illustrated. In the base station 18, the primary traffic transceiver 25 and packet data traffic transceiver 27 are connected to an antenna tower 54 that transmits and receives the first and second sets of carriers 26 and 28. The primary traffic and packet data traffic transceivers 25 and 27 are connected to a controller 50, which may be implemented in hardware or a combination of hardware and software. Also connected to the controller 50 is a GPS timing receiver or other synchronization circuit 19 that allows synchronization of all base stations in the group of cells 14 controlled by the MSC 12 and the data traffic service node 35. Further, the base station 18 includes an MSC interface 52 that is coupled to a link 64 (e.g., a Ti link) that is in turn coupled to an interface unit 56 in the MSC 12. The base station 18 also includes an interface 51 (which in one embodiment is a $G_s$ interface 51 according to GPRS) for communicating over a link (e.g., a $G_s$ link) to the data traffic service node 35.

In the MSC 12, a control unit 58 provides the processing core of the MSC 12. The control unit 58 may be implemented with computer systems, processors, and other control devices. The control unit 58 is connected to a storage unit 62, which may contain one or more machine-readable storage media to store various data as well as software routines or modules that are loadable for execution by the control unit 58. For example, instructions of routines or modules that make up the primary traffic system controller 42 may be stored in the storage unit 62 and loaded for execution by the control unit 58. The MSC 12 may also include a PSTN interface 60 that is coupled to the PSTN 16 to allow communications with a PSTN-connected unit. Further, the MSC 12 includes an interface 75 (e.g., a $G_b$ interface) for communicating over a link (e.g., a $G_b$ link) to the data traffic service node 35.

The data traffic service node 35 includes interface units 77 and 79 for communicating over the $G_s$ and $G_b$ links, respectively, in one embodiment. The processing core of the data traffic service node 35 includes a control unit 69, which may be implemented with computer systems, processors, or other control devices. A storage unit 71 including machine-readable storage media is coupled to the control unit 69. Instructions associated with the routines and modules that make up the data traffic system controller 40 may be initially stored in the storage unit 71 and loaded by the control unit 69 for execution. The data traffic service node 35 further includes an interface 81 (e.g., a $G_n$ interface) for communicating with the GGSN 36 (FIG. 1A). In another embodiment, the interface 81 may be a network interface controller or other transceiver capable of communicating over the data network 32. In further embodiments, the data traffic and primary traffic system controllers 40 and 42 may be implemented in one platform and executable by the same control unit.

Carriers are communicated between the antennas 54 coupled to the base station 18 and an antenna 62 of a mobile unit 20. In one example arrangement of the mobile unit 20, one or more radio transceivers 64 are connected to the antenna 62 to send and receive packet data carriers and primary traffic carriers. A microprocessor 66 (or one or more other suitable control devices) may be coupled to the one or more radio transceivers 64. The microprocessor 66 is coupled to a storage unit 68, which may include machine-readable storage media including a non-volatile memory (such as a flash memory or an electrically erasable and programmable read-only memory) and/or dynamic and static random access memories (DRAMs and SRAMS). Instructions of software routines 68 executable on the microprocessor 66 may be initially stored in a non-volatile portion of the storage unit 68. One such software routine may be one to initialize the mobile unit 20 when it first powers up or when it first enters the region controlled by an MSC to search for primary traffic link control channels as well as to locate packet data link control channels in accordance with some embodiments. An input/output (I/O) controller 74 is coupled to the keyboard 70 and display 72 of the mobile unit 20.0

Figure 11:
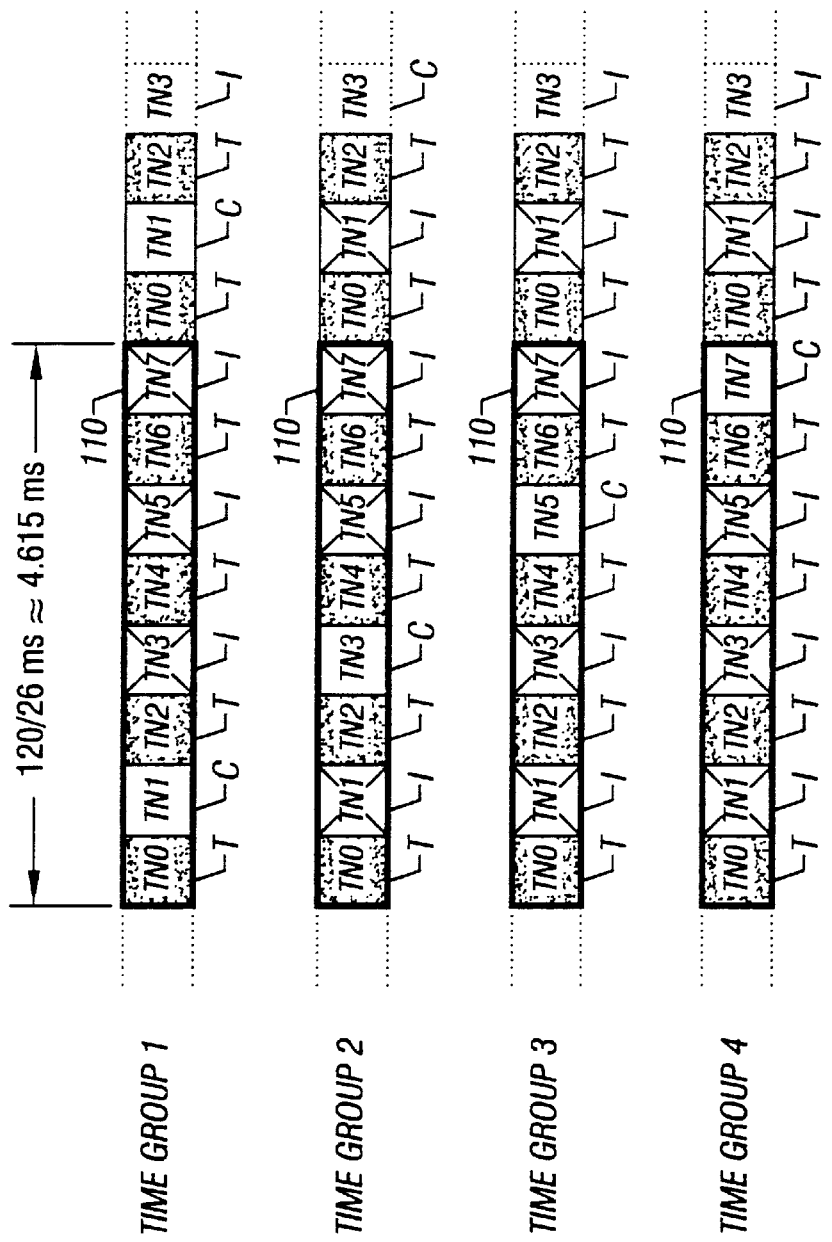
FIGS. 11 and 12 illustrate time-division multiple access (TDMA) frames for carrying data traffic and control channels in accordance with some embodiments in the packet-switched data link of the mobile communications system of FIG. 1A.

Referring to FIG. 11, each carrier (F1, F2 or F3) in the packet data link carries a TDMA frame 110 that is divided into a plurality of time slots. In the illustrated embodiment, eight time slots (or burst periods) TN0–TN7 are used. However, in further embodiments, a carrier may be divided into a smaller or larger number of time slots. In one embodiment, each TDMA frame 110 is structured like a GSM frame and has a length of 120/26 ms (or about 4.615 ms). To provide an effective 4/12 reuse pattern, control channels are staggered across four different time groups. In the illustrated embodiment, in time group 1, control channels (PBCCH, PCCCH, PFCCH, and PSCH in one embodiment) are transmitted during time slot TN1; in time group 2, control channels are transmitted in time slot TN3; in time group 3, control channels are transmitted during time slot TN5; and in time group 4, control channels are transmitted during time slot TN7. By staggering the control channels into different time slots as illustrated, a channel reuse pattern may be divided according to both frequency and time.

As illustrated in FIG. 11, the time slots are marked as one of a T time slot (during which packet data traffic may be communicated), a C time slot (during which control signals may be communicated), and an I time slot (during which all traffic and control channels are idle in blocks that transmit PBCCH and PCCCH on other time groups but which transmit packet data traffic otherwise). In one embodiment, a block includes four frames of a multiframe structure (e.g., a 51- or 52-frame multiframe).

Figure 12:
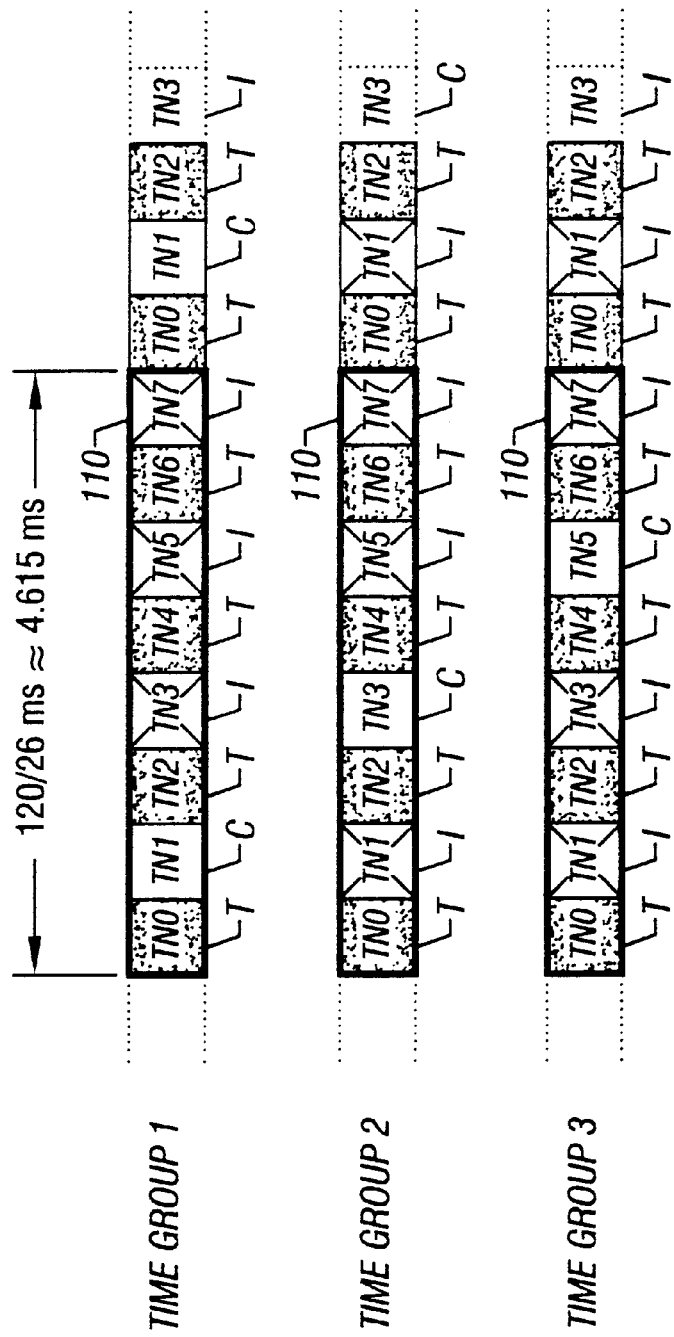

Referring to FIG. 12, an effective 3/9 reuse pattern includes three time groups T1, T2 and T3. In the illustrated embodiment, the control channels are placed in time slot TN1 (in time group T1), time slot TN3 (in time group T2), and time slot TN5 (in time group T3). The time slots that carry control channels are indicated as being C time slots. Also illustrated in FIG. 12 are T time slots (during which packet data traffic is transmitted) and I time slots (which are idle during blocks that transmit PBCCH or PCCCH in other time groups but which carry packet data traffic otherwise). In further embodiments, control channels may be carried in even time slots or in some other staggered scheme.

Figure 13:
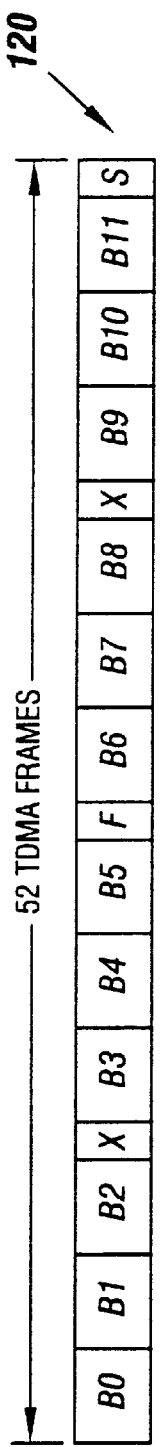
FIG. 13 illustrates a 52-frame multiframe for carrying data traffic and control channels in the system of FIG. 1A.
Figure 14A:
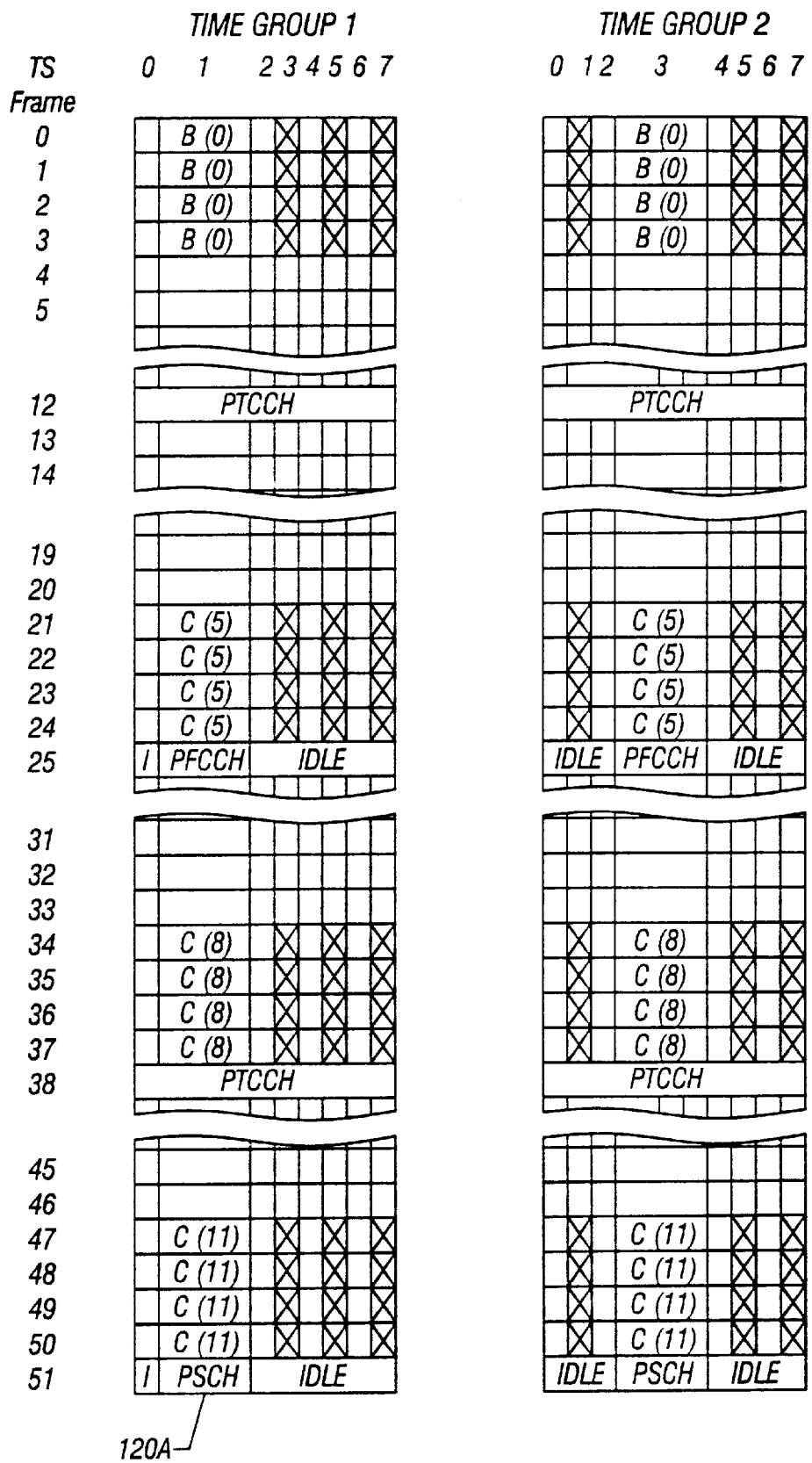
FIGS. 14A, 14B, and 15 illustrate multiframes in several time groups in accordance with some embodiments for carrying data traffic and control channels in the packet-switched data link.
Figure 14B:
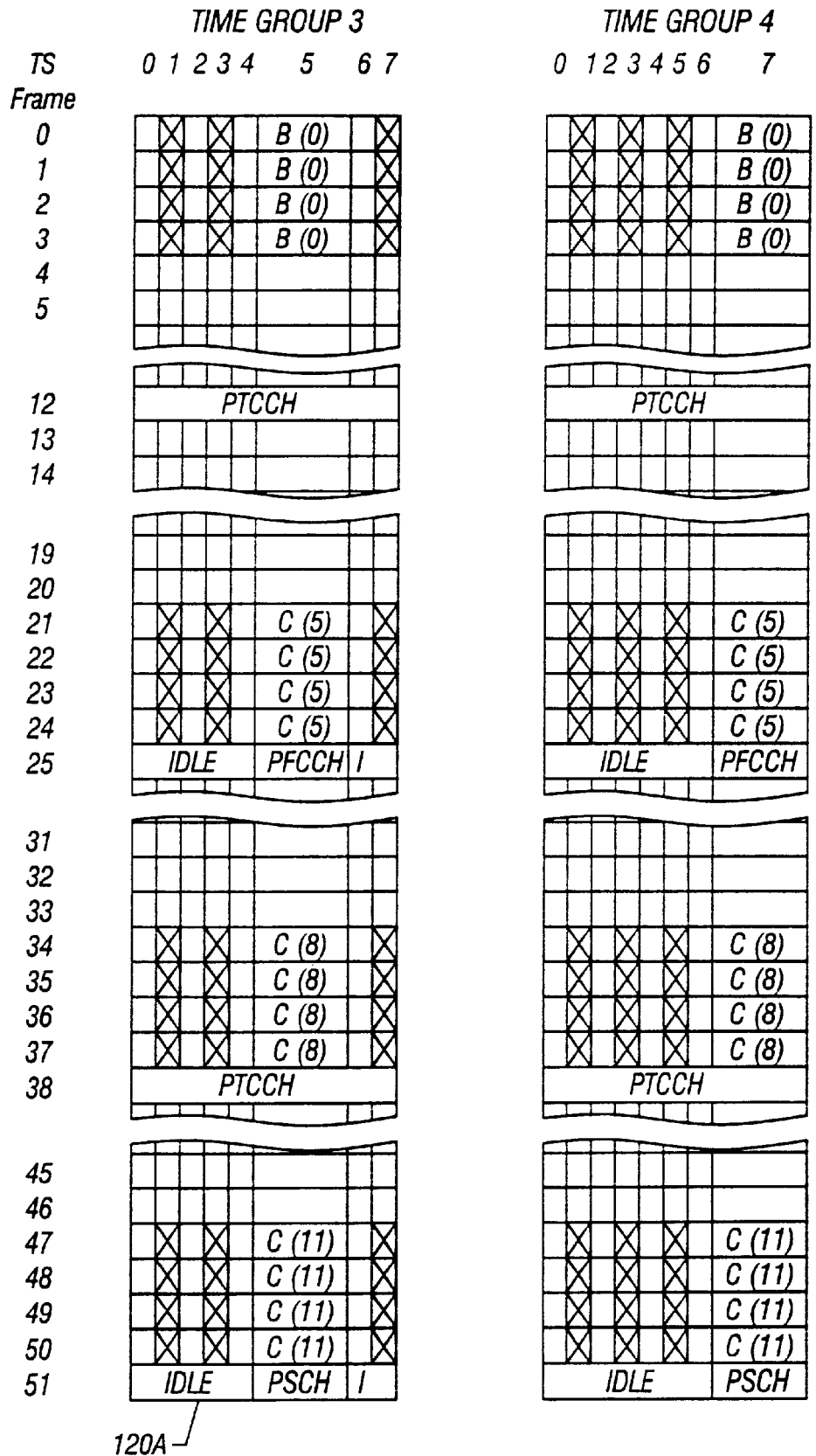
Figure 15:
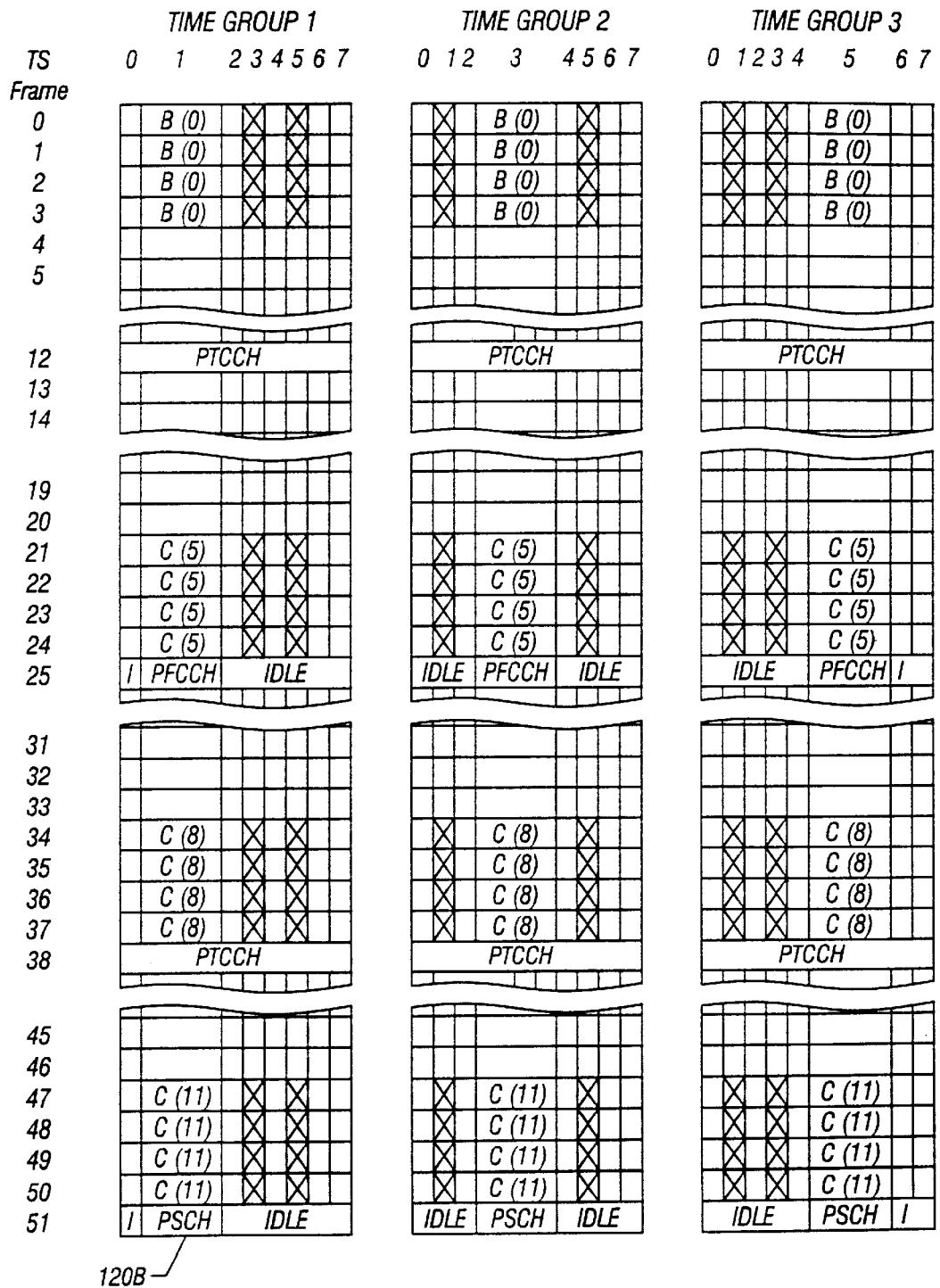

Referring to FIGS. 13–15, communication using 52-frame multiframes 120A and 120B in accordance with some embodiments is illustrated. The structure of a multiframe 120 is illustrated in FIG. 13. Each multiframe 120 includes 52 TDMA frames (FRN 0–51), which are divided into 12 blocks B0–B11, leaving four frames FRN 12, 25, 38, and 51 to carry predetermined channels. In further embodiments, other multiframe structures may be used, such as a 51-frame multiframe. For each time group (1, 2, 3, or 4), the eight columns of the multiframe 120 correspond to the eight time slots TN0–TN7, and the 52 rows correspond to the 52 frames of the multiframe 120. FIGS. 14A and 14B illustrate a multiframe structure 120A employing an effective 4/12 reuse pattern, and FIG. 15 illustrates a multiframe structure 120B employing an effective 3/9 reuse pattern.

In the illustrated example of FIGS. 14A, 14B, and 15, three blocks are assigned to PCCCH (frames containing a C) and one block is assigned to PBCCH (frames containing a B). A block includes four TDMA frames. The number of blocks allocated for PBCCH and PCCCH is flexible, from two up to 12 blocks per time slot in each multiframe 120. In the illustrated examples, PBCCH is carried in block B0, and PCCCH is carried in blocks B5, B8, and B11. Frames FRN 25 and 51 carry PFCCH and PSCH, respectively, and frames FRN 12 and 38 carry PTCCH.

Frames marked with an "X" are idle, and correspond to the odd time slots (TN1, TN3, TN5, or TN7) in blocks (0, 5, 8, and 11) that carry control channels PBCCH and PCCCH in other time groups. Thus, for example, the frames in block B0 in time slot TN3 in each of time groups 1, 3, and 4 are idle because the frames in time slot TN3 of time group 2 carries PBCCH. The same is true also for frames in blocks B5, B8, and B11 in time slots TN1, 3, 5, or 7 that do not carry control signaling.

By employing the locate feature in accordance with some embodiments, predetermined control signals of a packet data link that overlays or supplements a circuit-switched link may be efficiently and quickly located. Since control signals of the packet data link are transmitted as bursts rather than as a beacon, it may be time consuming to search for and locate desired packet control signals. In accordance with some embodiments, a pointer to the current frame of the packet data link is derived using values of counters in the circuit-switched link. Once the current packet frame is determined, the mobile unit can easily derive which frame it is in relative to a frame carrying desired control signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a mobile communications system having a first link and a second link, comprising:

identifying a first control signal of the first link;

determining, from information associated with the first control signal, the existence of the second link;

deriving, from information identifying a current frame structure in the first link, a pointer to a current frame structure of the second link; and locating a second control signal of the second link based on the pointer, wherein deriving the pointer comprises calculating a current fame number of a packet frame carried by the second link.

2. The method of claim 1, wherein the identifying includes identifying the first control signal of a circuit-switched link.

3. The method of claim 2, wherein the deriving includes deriving the pointer to the current frame structure of a packet-switched link.

4. A method for use in a mobile communications system having a first link and a second link, comprising:

identifying a first control signal of the first link;

determining, from information associated with the first control signal, the existence of the second link;

deriving, from information identifying a current frame structure in the first link, a pointer to a current frame structure of the second link;

locating a second control signal of the second link based on the pointer, and decoding the second control signal, the second control signal comprising one of a synchronization channel and a frequency correction channel.

5. A method for use in a mobile communications system having a first link and a second link, comprising:

communicating signals in a series of frame structures in the first link;

identifying information indicating a current frame structure of the first link;

locating a control signal in the second link using the information indicating the current frame structure of the first link; and deriving a pointer based on the information indicating the current frame structure of the first link, the pointer indicating a location of the control signal.

6. The method of claim 5, wherein the communicating includes communicating in a circuit-switched link.

7. The method of claim 5, wherein the locating includes locating a control signal in a packet-switched data link.

8. The method of claim 5, wherein the identifying includes determining values of counters tracking the current frame structure of the first link.

9. The method of claim 5, further comprising reading a value of a special counter that is adapted to correlate frame structures in the first link to frame structures in the second link.

10. The method of claim 5, wherein the pointer includes a current frame number of a packet frame carried by the second link.

* * * * *